United States Patent
Phelps et al.

(10) Patent No.: US 9,094,741 B2
(45) Date of Patent: Jul. 28, 2015

(54) MULTI-MEMBRANE MICROPHONE FOR HIGH-AMPLITUDE AUDIO CAPTURE

(75) Inventors: Andrew Duncan Phelps, Southampton (GB); Mikko Veli Aimo Suvanto, Tampere (FI)

(73) Assignee: Nokia Technologies Oy, Espoo (FI)

( * ) Notice: Subject to any disclaimer, the term of this patent is extended or adjusted under 35 U.S.C. 154(b) by 443 days.

(21) Appl. No.: 13/524,128

(22) Filed: Jun. 15, 2012

(65) Prior Publication Data

US 2012/0250884 A1  Oct. 4, 2012

Related U.S. Application Data

(62) Division of application No. 12/321,458, filed on Jan. 20, 2009, now Pat. No. 8,233,637.

(51) Int. Cl.
| | |
|---|---|
| *H04B 15/00* | (2006.01) |
| *H04R 3/00* | (2006.01) |
| *H04M 1/60* | (2006.01) |
| *H04M 1/03* | (2006.01) |
| *H04R 19/00* | (2006.01) |

(52) U.S. Cl.
CPC ............... *H04R 3/00* (2013.01); *H04M 1/6008* (2013.01); *H04R 3/005* (2013.01); *H04M 1/035* (2013.01); *H04R 19/005* (2013.01); *H04R 2410/07* (2013.01); *H04R 2430/01* (2013.01); *H04R 2499/11* (2013.01)

(58) Field of Classification Search
CPC .......... H04R 3/005; H04B 1/123; H03G 5/18; G10L 21/02; G10L 21/0208
USPC ........................................................ 381/94.2
See application file for complete search history.

(56) References Cited

U.S. PATENT DOCUMENTS

| | | | |
|---|---|---|---|
| 6,870,494 B1 * | 3/2005 | Cheng et al. .................. | 341/144 |
| 6,882,734 B2 | 4/2005 | Watson et al. .................. | 381/92 |
| 7,323,922 B1 * | 1/2008 | Jones ............................. | 327/308 |
| 7,616,142 B1 * | 11/2009 | Mai ............................... | 341/143 |
| 7,676,052 B1 | 3/2010 | Ma et al. ........................ | 381/356 |
| 7,756,282 B2 | 7/2010 | Rass et al. ..................... | 381/313 |
| 8,223,981 B2 | 7/2012 | Haila et al. .................... | 381/57 |
| 2002/0015503 A1 | 2/2002 | Hou ............................ | 381/94.3 |
| 2002/0057815 A1 | 5/2002 | Killion ........................ | 381/313 |
| 2003/0064746 A1 | 4/2003 | Rader et al. ................... | 455/550 |
| 2003/0210799 A1 | 11/2003 | Gabriel et al. ................ | 381/173 |

(Continued)

FOREIGN PATENT DOCUMENTS

| | | |
|---|---|---|
| CN | 101268677 A | 9/2008 |
| EP | 1 385 324 A1 | 1/2004 |

(Continued)

OTHER PUBLICATIONS

"SiSonic Design Guide", Apr. 20, 2006, pp. 1-29, XP55118395, Retrieved from the Internet: URL: www.all-electronics.de/media/file/17754.

*Primary Examiner* — Simon Sing
(74) *Attorney, Agent, or Firm* — Harrington & Smith (57) ABSTRACT

Disclosed herein are apparatus, method, and computer program product whereby a device receives an acoustic signal. In response to the received acoustic signal, the device outputs electrical signals from a first input audio transducer and a second input audio transducer. The second input audio transducer is less sensitive than the first input audio transducer.

13 Claims, 7 Drawing Sheets

(56) References Cited

U.S. PATENT DOCUMENTS

| | | | |
|---|---|---|---|
| 2006/0013413 A1* | 1/2006 | Sakaidani | 381/104 |
| 2007/0009127 A1 | 1/2007 | Klemenz et al. | 381/317 |
| 2007/0047746 A1 | 3/2007 | Weigold et al. | 381/174 |
| 2007/0133826 A1 | 6/2007 | Burk et al. | 381/122 |
| 2007/0186656 A1 | 8/2007 | Goldberg et al. | 73/647 |
| 2008/0049953 A1 | 2/2008 | Harney et al. | 381/94.7 |
| 2008/0175399 A1 | 7/2008 | Kim et al. | 381/57 |
| 2008/0192962 A1 | 8/2008 | Halteren | 381/170 |
| 2008/0205668 A1 | 8/2008 | Torii et al. | 381/113 |
| 2009/0002498 A1 | 1/2009 | Oku | 348/207.99 |
| 2009/0022327 A1* | 1/2009 | Braun | 381/1 |
| 2009/0051577 A1* | 2/2009 | Rzehak | 341/143 |
| 2009/0289709 A1* | 11/2009 | Khoury et al. | 330/251 |
| 2010/0117485 A1 | 5/2010 | Martin et al. | 310/319 |

FOREIGN PATENT DOCUMENTS

| | | |
|---|---|---|
| EP | 1565034 A1 | 8/2005 |
| EP | 1 732 352 A1 | 12/2006 |
| EP | 1 962 546 A2 | 8/2008 |
| JP | 3139097 A | 6/1991 |
| SU | 1582361 A1 | 7/1990 |
| WO | WO-00/47014 A1 | 8/2000 |
| WO | WO-03/059010 A1 | 7/2003 |
| WO | WO-2004/036743 A1 | 4/2004 |
| WO | WO-2004/072958 A1 | 8/2004 |
| WO | WO-2004/103020 A1 | 11/2004 |
| WO | WO-2006/007441 A1 | 6/2006 |

* cited by examiner

MULTI-MEMBRANE MICROPHONE FOR HIGH-AMPLITUDE AUDIO CAPTURE

CROSS REFERENCE TO RELATED APPLICATIONS

This application is a divisional patent application claiming priority under 35 U.S.C. 120 to U.S. patent application Ser. No. 12/321,458, filed on Jan. 20, 2009 now U.S. Pat. No. 8,233,637.

TECHNICAL FIELD

The exemplary and non-limiting embodiments of this invention relate generally to improvements in audio capture/recording of high amplitude audio signals.

BACKGROUND

Various abbreviations that appear in the specification and/or in the drawing figures are defined as follows:
ADC analog to digital converter
ASIC application specific integrated circuit
dB decibel
dBFS decibel full scale
DSP digital signal processing
ECM electret condenser microphone
EMC electromagnetic compatibility
Gnd ground
L/R left/right
MEMS micro electro-mechanical system
PDM pulse density modulation
SNR signal to noise ratio
SPL sound pressure levels
Vdd supply voltage Audio-visual camcording is one of the most common uses for a mobile device with multimedia capabilities. Advances have been made with respect to the visual capturing components. Customer expectations have in turn risen in regards to the quality of video recordings, however the audio components including both capture and playback have lagged behind the visual side. This may be especially problematic when capturing video events that have high sound pressure levels (SPL). The internal microphone of the mobile device can saturate easily when trying to record high SPLs, which are also frequency dependent. The recorded audio signal can result in heavy distortion and compression which influences the overall audio quality.

Audio distortion may also occur in windy environments. The movement of air across a microphone element of a mobile device may generate unwanted noise. This unwanted noise may reduce the intelligibility of the audio and force a user of the mobile device to terminate a phone call prematurely.

Figure 1:
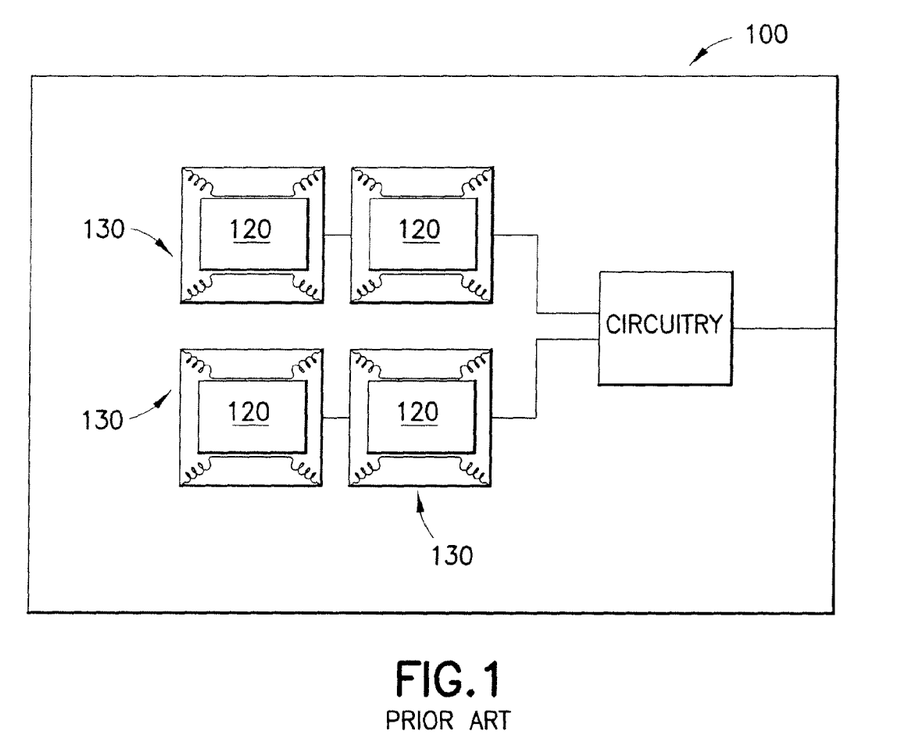
FIG. 1 reproduces FIG. 3A of US Patent Application Publication US 2007/0047746 A1, which shows an example of an arrangement of microphone membranes.

Currently some mobile devices with multimedia capabilities fail to provide sufficient audio capture in a high SPL environment. The quality of audio capture often depends on the microphone arrangement and microphone design. One possible arrangement involves implementing multiple microphones on a single base as is shown in FIG. 1, which is a reproduction of FIG. 3A of US Patent Application Publication US 2007/0047746 A1. The microphone system shown in FIG. 1 has a base 130, and a plurality of substantially independently movable membranes 120 secured to the base 130. Each of the plurality of membranes 120 forms a variable capacitance with the base 130. Thus, each membrane 120 effectively forms a generally independent, separate microphone with the base 130.

Figure 2:
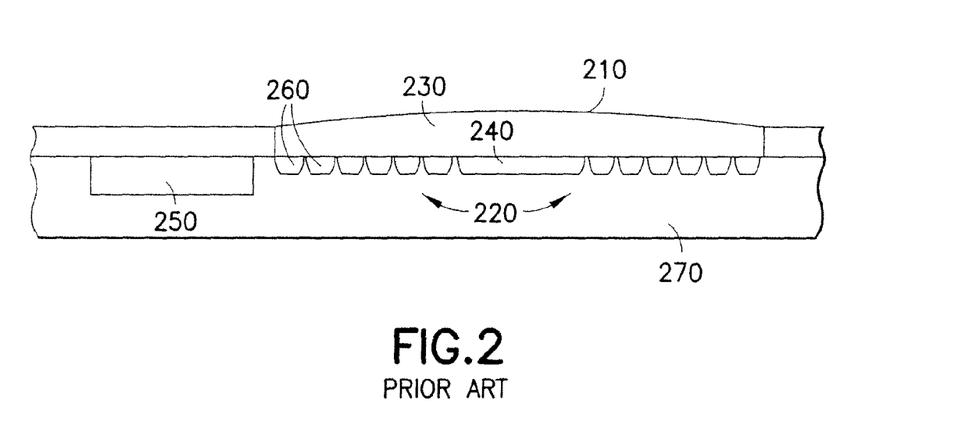
FIG. 2 reproduces FIG. 3 of US Patent Application Publication US 2003/0210799 A1, which shows a further example of an arrangement of microphone membranes.

Another possible arrangement involves a direct digital microphone that is constructed of a plurality of first membranes 220 each formed by a micro-machined mesh supported by a substrate 270. This is shown in FIG. 2, which is a reproduction of FIG. 3 of US Patent Application Publication US 2003/0210799 A1. A second membrane 210 and a plurality of first membranes 220 are located in two different positions. The plurality of first membranes 220 is comprised of individual first membranes 260. The second membrane 210 is supported by a substrate 270 and positioned above the plurality of first membranes 220 to form a chamber 230 between the plurality of first membranes 220 and the second membrane 210. A pressure sensor 240 is responsive to pressure in the chamber 230. Drive electronics 250 are responsive to the pressure sensor 240 and control the positions of the plurality of first membranes 220. Polling electronics 250 are responsive to the positions of the plurality of first membranes 220 and produce a digital output signal.

SUMMARY

A first embodiment of the invention is a method comprising: receiving an acoustic signal; and in response to the received acoustic signal, outputting electrical signals from a first input audio transducer and a second input audio transducer, where the second input audio transducer is less sensitive than the first input audio transducer.

Another embodiment of the invention is an apparatus comprising: a substrate; a first input audio transducer mounted over the substrate configured to output an electrical signal from an acoustic signal; and a second input audio transducer mounted over the substrate configured to output an electrical signal from the acoustic signal, where the second input audio transducer is less sensitive than the first input audio transducer.

Another further embodiment of the invention is a method comprising: receiving an acoustic signal; in response to the received acoustic signal, outputting an electrical signal from an input audio transducer, where the output from the input audio transducer follows a normal sensitivity path and a high amplitude path; and outputting electrical signals from both the normal sensitivity path and the high amplitude path on one pulse density modulation stream, where the electrical signal output from the normal sensitivity path has a higher decibel full scale level than the electrical signal output from the high amplitude path.

Another further embodiment of the invention is an apparatus comprising: an input audio transducer configured to output an electrical signal from an acoustic signal, where the electrical signal passes through a normal sensitivity path and a high amplitude path; and circuitry configured to output electrical signals passed through both the normal sensitivity path and the high amplitude path on one pulse density modulation stream, where the electrical signal output from the normal sensitivity path has a greater decibel full scale level than the electrical signal output from the high amplitude path.

DETAILED DESCRIPTION

The two arrangements shown in FIGS. 1 and 2, as well as in corresponding US Patent Application Publications 2007/0047746 A1, and US 2003/0210799 A1, lack any mention of a desensitized membrane. Furthermore, the arrangement in regards to FIG. 1 contains four membranes. Also, the arrangement in regards to FIG. 2 is focused primarily on stacked membranes. In addition neither of these arrangements account for potential wind noise.

In one exemplary embodiment of this invention, there are at least two membranes with one membrane being desensitized as compared to the other membrane. Neither of these membranes need be stacked, and the arrangement allows for the recording of audio at high SPL levels without saturation. There is a higher noise floor of the desensitized membrane and thus a smaller SNR.

Exemplary embodiments of this invention allow for operation of a mobile device during noisy conditions such as those due to wind, traffic, a crowd, etc. Previously a high-pass electrical filter was implemented between a microphone capsule and an ASIC in order to allow for operations in windy conditions. This, however, is an imperfect solution for at least three reasons: 1) the microphone output signal is often already saturated by wind noise, 2) the demands of preferred audio quality in non-windy environment require the high-pass filter to be set at a point which will still pass a large proportion of the wind noise, and 3) this strategy is not possible with digital microphones. Attempts have been made to use DSP circuitry to clean a windy signal from a multiple array of microphones but they have had limited effectiveness.

In an exemplary two-membrane embodiment of the invention detailed further below (e.g., FIG. 8), each membrane has a different sensitivity and each outputs a separate signal. In an exemplary implementation where only the signal from the less sensitive membrane has an acceptable distortion level, only that signal is selected for further processing and the other signal (which may be overly distorted due to signal clipping as the high-amplitude sound field exceeds the full scale output of the membrane and ADCs) is disregarded/dumped. Additionally, there may also be a high pass filter on one or both signal paths which can be selectively activated based on wind noise levels. The filter on the signal path that is continued may be activated to further reduce wind noise in some instances where the signal is additionally distorted in this way.

Exemplary embodiments of this invention address the problem of sound distortion and compression in the recording of audio in a high SPL environment, and when operating a mobile device in noisy conditions.

Figure 3:
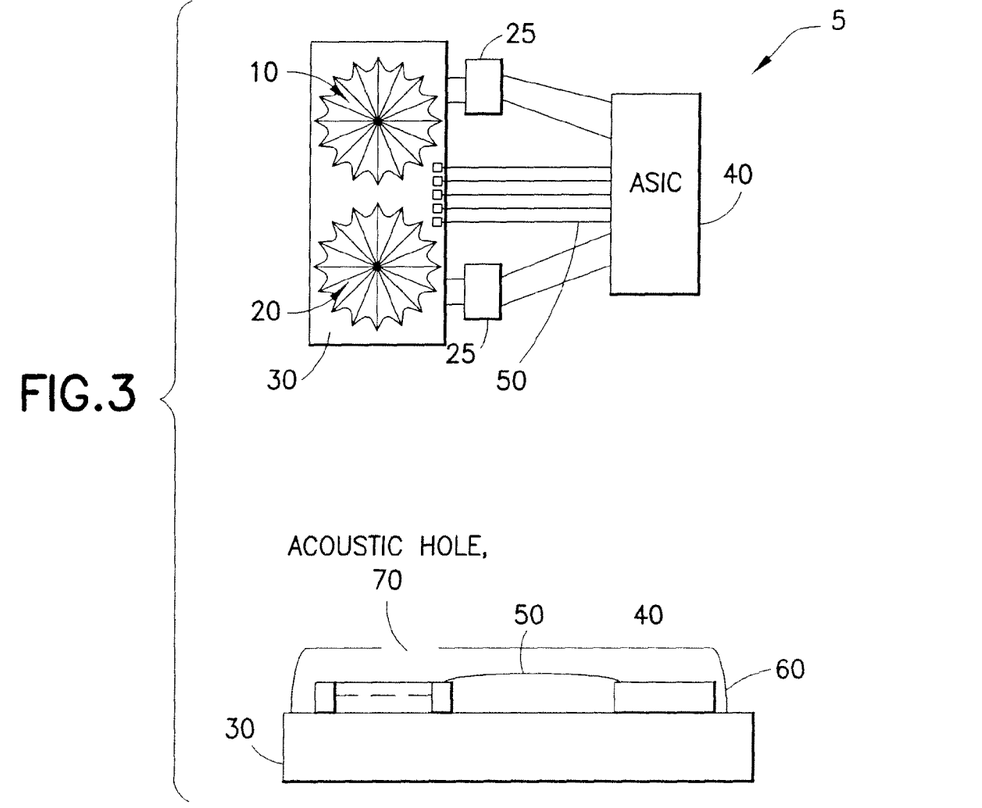
FIG. 3 shows a simplified block diagram of various electronic devices that are suitable for use in practicing the exemplary embodiments of this invention.

Reference is made to FIG. 3 for illustrating a simplified block diagram of an exemplary embodiment of this invention. In FIG. 3 a device 5 includes at least a first input audio transducer, also referred to herein as a first membrane 10, a substrate 30, circuitry such as an ASIC 40, wire bonding 50, a grounded EMC shield, and an acoustic hole 70. The device 5 may also contain a second input audio transducer, also referred to herein as a second membrane 20. Both the first membrane 10 and the second membrane 20 are configured to transduce audio, such as an acoustic signal, into electrical signals.

Figure 8:
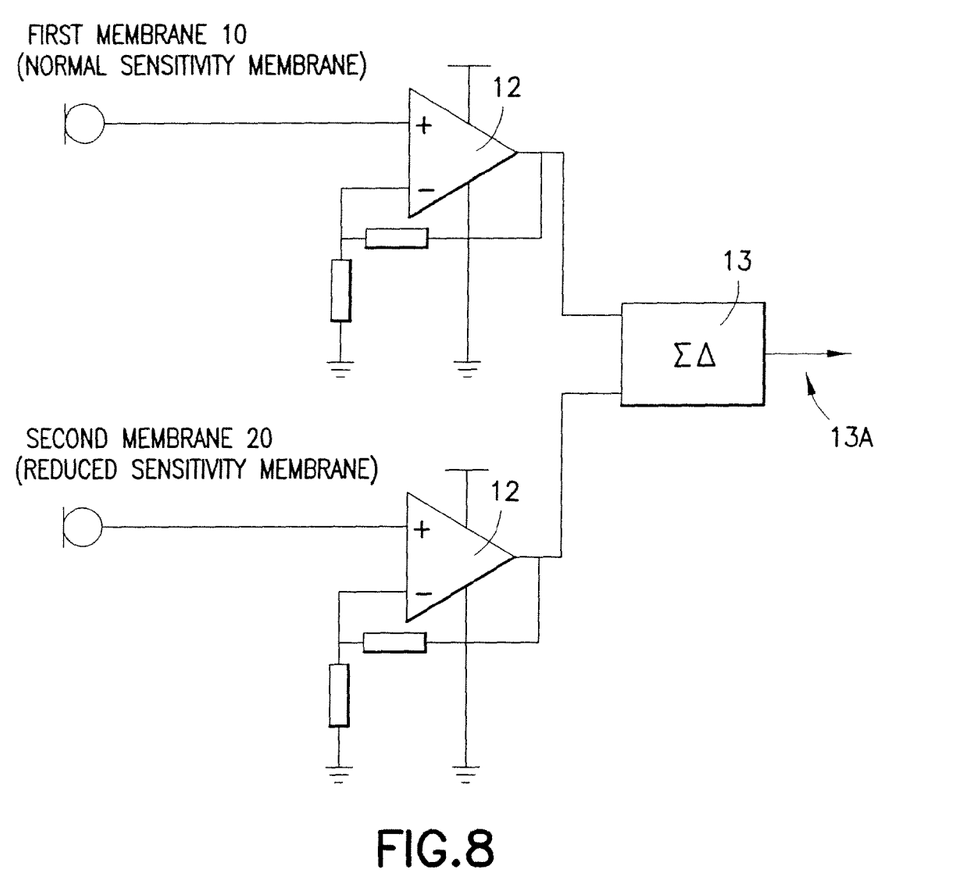
FIG. 8 shows a block diagram of a configuration of a device with two membranes.
Figure 9:
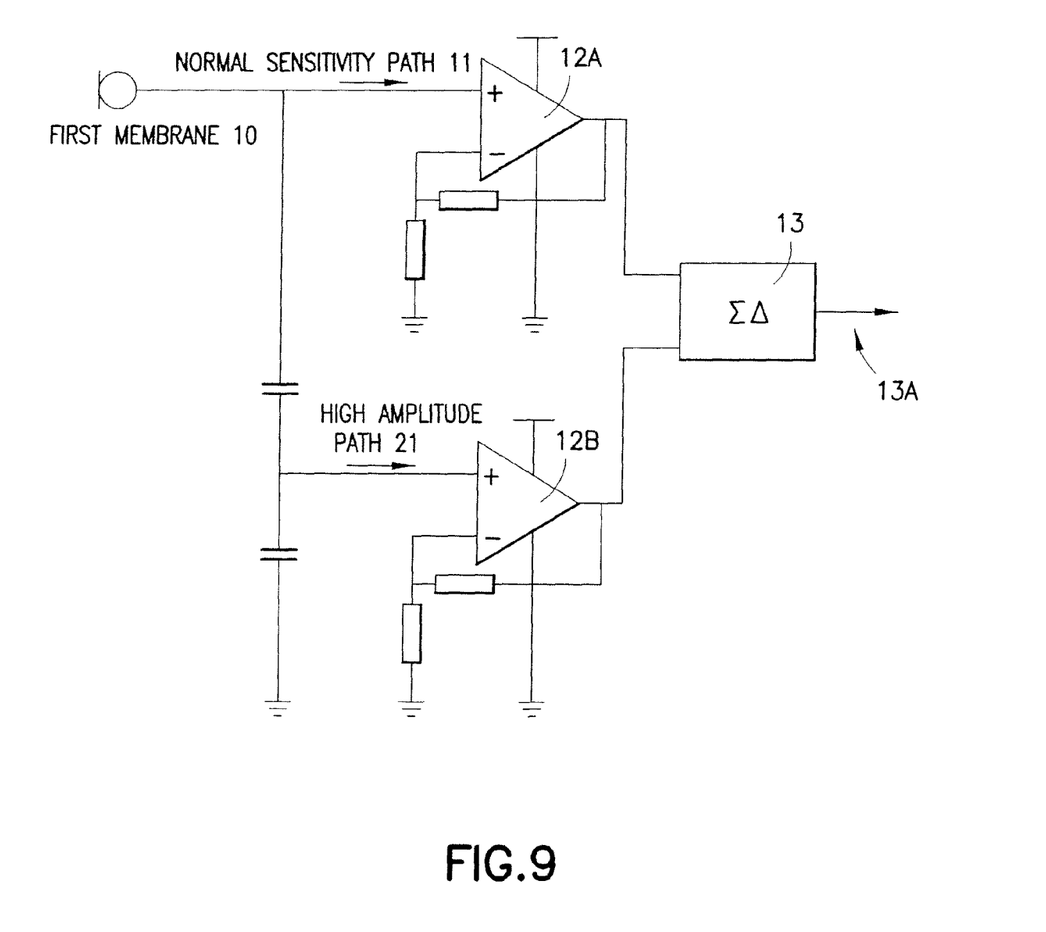
FIG. 9 shows a block diagram of a configuration of a device with one membrane.

FIGS. 8 and 9 show two different and exemplary membrane configurations that can be implemented into device 5. In FIG. 8, an acoustic signal is passed through both the first membrane 10 and the second membrane 20. The second membrane 20 has a lowered sensitivity as compared to the first membrane 10, meaning that the second membrane has a lower maximum SPL threshold. The first membrane 10 and the second membrane 20 both output electrical signals. These electrical signals are then passed through amplification stages 12. The amplification stages 12 may include signal processing. The amplification stages 12 may be contained in the ASIC 40. The resulting signals are then sent to an ADC, such as sigma delta modulator 13. The sigma delta modulator 13 encodes high resolution signals into lower resolution signals using PDM. The sigma delta modulator 13 may be contained in the ASIC 40. The sigma delta modulator may output the electrical signals which it receives from both the first membrane 10 and the second membrane 20 on the same output PDM stream 13A. A switch may be implemented between the outputs from both of the membranes and ASIC 40 to allow for switching between the output from the first membrane 10 to the second membrane 20 or vice versa. The switching may be performed by user input or automatically via circuitry such as ASIC 40.

In FIG. 9, an acoustic signal is passed through the first membrane 10 and follows a high amplitude path 21 and a normal sensitivity path 11. The high amplitude path 21 contains amplification stage 12B and the normal sensitivity path 11 contains amplification stage 12A. Both amplification stages may contain signal processing. The resulting signal via the high amplitude path has a lower dBFS level than the normal sensitivity path. A dBFS level is the decibel amplitude level of a signal. The signals from both paths pass through an ADC, such as sigma delta modulator 13, where both of the signals are output on the same PDM stream 13A.

Figure 6:
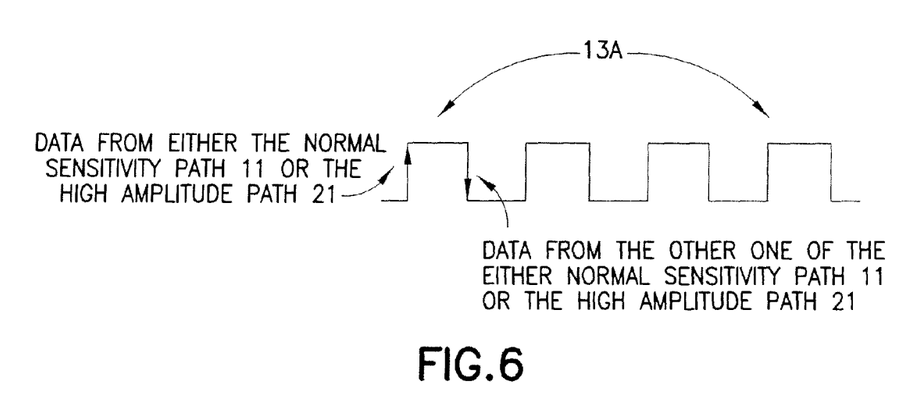
FIG. 6 shows an example of how data may be output from a microphone system that comprises the electronic device of FIG. 3.

FIG. 6 shows the PDM stream 13A with two different data, one data on the falling edge and a different data on the rising edge. These two different data may correspond to the output from the first membrane 10 and the second membrane 20 or the output from the normal sensitivity path 11 and the high amplitude path 21.

As is shown in FIG. 3, the first membrane 10 and the second membrane 20 may be mounted over a substrate 30. A high pass filter 25 may be placed between each of the membranes and the ASIC 40. The high pass filter 25 allows for additional noise suppression and its placement between the membrane(s) and the ASIC 40 is optional. In a non-limiting example the high pass filter 25 is set to approximately 500 HZ for example, and is switchable between an active filtering state in which it filters the audio signal (e.g., when distortion is seen to exceed a preset threshold) and an inactive state in which the signal passes through unfiltered. At 500 HZ, a majority of unwanted noise may be removed, thus improving intelligibility of the output signal. The high pass filter 25 may be implemented as an integrated circuit, or may be constructed from the design of a front-to-back acoustic leak around a membrane, or by a combination of both. The substrate 30 may also have a back-plate to connect to the device 5. The first membrane 10 and the second membrane 20 are connected to the ASIC 40 via wire bonding 50. The ASIC 40 is configured to condition and digitize the output signal from the first membrane 10 and/or the second membrane 20. The ASIC 40 may also include DSP circuitry. The DSP circuitry may be used to identify when wind noise is present on the output signal of the first membrane 10. The ASIC 40 is configured to switch between the first membrane 10 and the second membrane 20 in order to output signals absent distortion or noise. The grounded EMC shield 60 surrounds the ASIC 40 to prevent electromagnetic disturbances. The acoustic hole 70 is a channel between the first membrane 10 and the second membrane 20 and a sound source.

The exemplary embodiments of this invention may be implemented at least in part by computer software executable by the ASIC 40 of the device 5, or by hardware, or by a combination of software and hardware.

Figure 5:
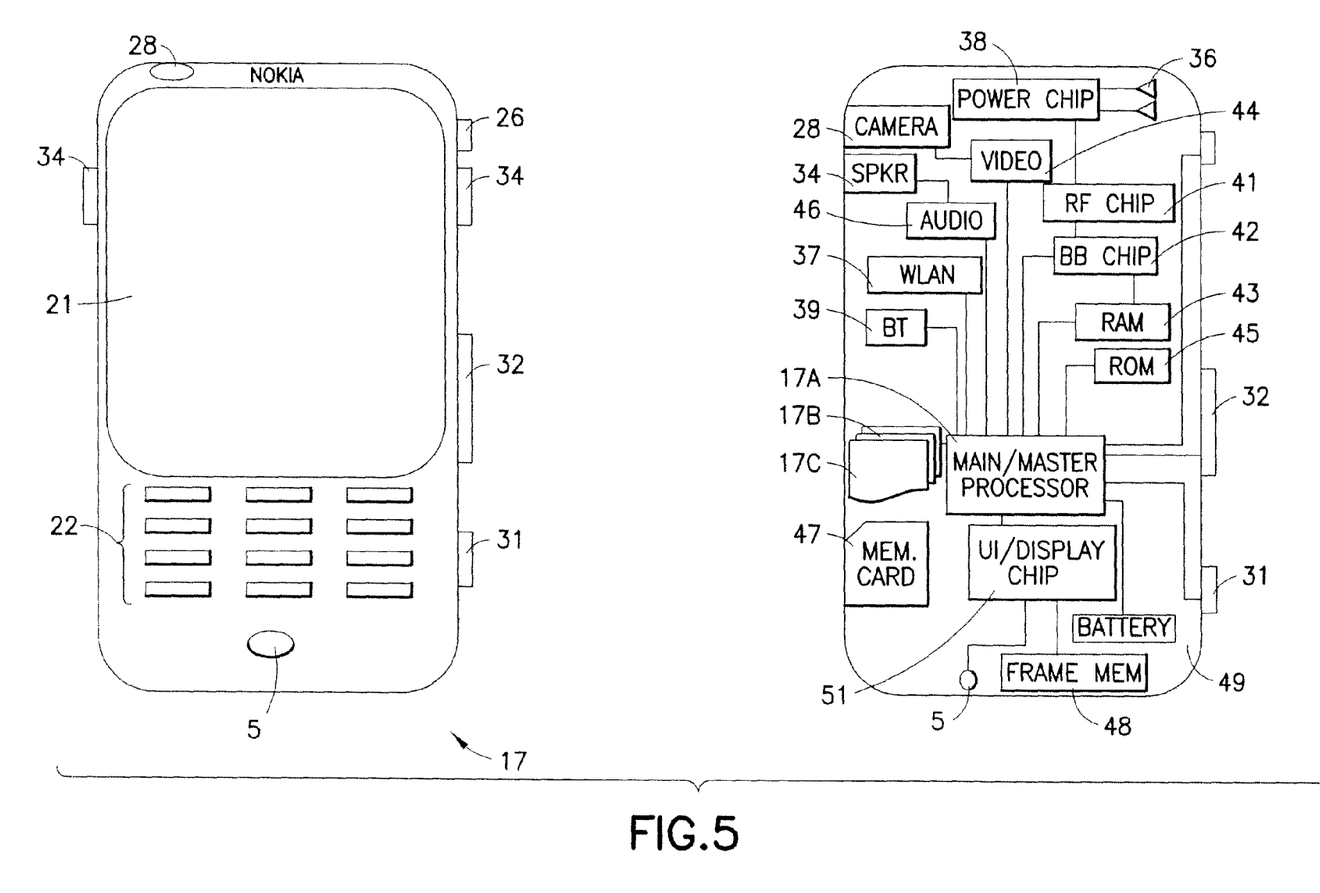
FIG. 5 shows the block diagram of FIG. 3 implemented onto a mobile device.

FIG. 5 shows the exemplary embodiment of FIG. 3 (device 5) implemented into a mobile communication device such as a user equipment UE 17. The UE 17 includes a controller, such as a computer or a data processor (DP) 17A, a computer-readable memory medium embodied as a memory (MEM) 17B that stores a program of computer instructions (PROG) 17C, and a suitable radio frequency (RF) transceiver (shown generally as a RF chip 41) for bidirectional wireless communications.

In general, the various embodiments of the UE 17 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEM 17B may be of any type suitable to the local technical environment and may be implemented using any suitable data storage technology, such as semiconductor based memory devices, flash memory, magnetic memory devices and systems, optical memory devices and systems, fixed memory and removable memory. The DP 17A may be of any type suitable to the local technical environment, and may include one or more of general purpose computers, special purpose computers, microprocessors, digital signal processors (DSPs) and processors based on a multicore processor architecture, as non-limiting examples.

FIG. 5 illustrates the UE 17 in both plan view (left) and sectional view (right), and the invention may be embodied in one or some combination of those more function-specific components. The UE 17 has a graphical display interface 21 and a user interface 22 illustrated as a keypad but understood as also encompassing touch-screen technology at the graphical display interface 21 and voice-recognition technology received at the device 5. A power actuator 26 controls the UE 17 being turned on and off by the user. The exemplary UE 17 may have a camera 28 which is shown as being forward facing (e.g., for video calls) but may alternatively or additionally be rearward facing (e.g., for capturing images and video for local storage). The camera 28 is controlled by a shutter actuator 31 and optionally by a zoom actuator 32 which may alternatively function as a volume adjustment for the speaker(s) 34 when the camera 28 is not in an active mode.

Within the sectional view of FIG. 5 are seen multiple transmit/receive antennas 36 that are typically used for cellular communication. The antennas 36 may be multi-band for use with other radios in the UE 17. The operable ground plane for the antennas 36 is shown by shading as spanning the entire space enclosed by the UE 17 housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 41 which demodulates and downconverts the signal for baseband processing. The baseband (BB) chip 42 detects the signal which is then converted to a bit-stream and finally decoded. Similar processing occurs in reverse for signals generated in the UE 17 and transmitted from it.

Signals to and from the camera 28 pass through an image/video processor 44 which encodes and decodes the various image frames. A separate audio processor 46 may also be present controlling signals to and from the speakers 34 and the device 5. The graphical display interface 21 is refreshed from a frame memory 48 as controlled by a user interface chip 51 which may process signals to and from the display interface 21 and/or additionally process user inputs from the keypad 22 and elsewhere.

Certain embodiments of the UE 17 may also include one or more secondary radios such as a wireless local area network radio WLAN 37 and a Bluetooth® radio 39, which may incorporate an antenna on-chip or be coupled to an off-chip antenna. Throughout the UE 17 are various memories such as random access memory RAM 43, read only memory ROM 45, and in some embodiments removable memory such as the illustrated memory card 47. The various programs 17C are stored in one or more of these memories. All of these components within the UE 17 are normally powered by a portable power supply such as a battery 49.

The aforesaid processors 38, 41, 42, 44, 46, 51, if embodied as separate entities in the UE 17, may operate in a slave relationship to the main processor 17A, which may then be in a master relationship to them.

Note that the various chips (e.g., 38, 41, 42, etc.) that were described above may be combined into a fewer number than described and, in a most compact case, may all be embodied physically within a single chip.

The ASIC 40 of device 5 may be implemented into the user interface chip 51 instead of the microphone device 5.

The exemplary embodiments of this invention may be implemented in microphone systems, including but not limited to ECM or MEMS microphones.

In one exemplary embodiment of this invention two membranes are mounted onto a shared substrate 30. In a non-limiting example, the first membrane 10 is configured with a maximum SPL between about 120 dB and about 140 dB. The second membrane 20 is similar to the first membrane except it is desensitized and configured with a maximum SPL that is, for example, about 20-30 dB less than the first membrane 10. The desensitization of the second membrane 20 provides a lower chance of saturation. The second membrane 20 may be desensitized due to its configuration, for example, via use of a thicker membrane and/or increased stiffness around the periphery of the membrane. Alternatively, the capacitive gap between the second membrane 20 and the back-plate of the substrate 30 may be increased. This is the preferred method as it also serves to reduce the air-squeeze noise between the second membrane 20 and the back-plate of the substrate 30. The air-squeeze noise contributes to the self-noise of microphone, and it is advantageous to reduce this type of self-induced noise.

In another exemplary embodiment the device 5 outputs both the electrical signals, corresponding to either the first membrane 10 and the second membrane 20 or the normal sensitivity path 11 and the high amplitude path 21 in one PDM stream 13A. The PDM stream 13A is output from circuitry such as ASIC 40. The electrical signal outputs of the PDM stream 13A may be scanned for evidence of clipping. Generally, at the maximum allowable output signal level (e.g., that allowed by the ADC(s) and digital processors for example) A signal may be considered clipped when the peak level has reached 0 dBFS. However, in the decimation of a PDM stream the correlation between the output signal dBFS values and the overload point is harder to determine, and will be determined by factors such as ADC design, digital processing, and frequency. The scanning may be performed by ASIC 40. Clipping is evidence of signal distortion. The electrical signal output with the least amount of clipping may then be selected for saving and/or for further processing.

In another exemplary embodiment the device 5 outputs an electrical signal from one membrane. The membrane may be chosen by a user, via a user interface or switch. Alternatively the device 5 may output only the electrical signal from the first membrane 10 and upon the electrical signal having a peak output level of 0 dBFS, the device 5 automatically switches to second membrane 20 for the output. The switching may be done via circuitry such as ASIC 40 or by another component such as the DP 17A of UE 17. The ASIC may be further configured to automatically switch back from second membrane 20 to the first membrane 10. This may occur under one of at least two conditions: 1) where the output from the second membrane 20 is analyzed and indicates a SPL that is less than the maximum allowable SPL of the first membrane 10 or 2) where the first membrane 10 continues to output a signal that shows an acceptable level of signal distortion during analysis, for example, a peak dBFS level that is less than zero.

In another exemplary embodiment the device 5 outputs an electrical signal from the first membrane 10. The electrical signal output from the first membrane is searched for wind noise. The ASIC 40 may perform this searching. Upon the discovery of wind noise the device 5 switches the high pass filter.

In another exemplary embodiment the device of FIG. 3 is implemented into a microphone system and communicates with another device. The microphone system may output a signal, such as a PDM stream 13A, to a compatible another device. The output may be set so that data asserted on a falling clock edge is a normal sensitivity signal corresponding to the normal sensitivity path 11 (or first membrane 10) and data asserted on the rising clock edge is a lowered sensitivity signal corresponding to the high amplitude path 21 (or second membrane 20), as is shown in FIG. 6. The data on the rising and falling clock edge may be implemented vice versa as well. This provides the another device an option to choose the desired sensitivity. Another device may be a mobile device, camcorder, UE 17, or any device capable of housing or controlling audio/video capture. The another device or circuitry such as ASIC 40 may scan the signal corresponding to the normal sensitivity path 11 for evidence of signal clipping as noted above. In the event that signal clipping is present, the high amplitude path 21 signal output could be substituted for the normal sensitivity path 11 signal output prior to any type of file saving.

The device of FIG. 3 may be further integrated into a multiple microphone array.

In another exemplary embodiment of this invention the switching or toggling between the first membrane 10 and the second membrane 20 may be done with one signal line having two states; high and low (1 and 0). Alternatively the switching may be done through a pin that is used for other purposes such as (L/R, Vdd, or Gnd). The first membrane 10 and the second membrane 20 may be used in a stereo mode by using a L/R selection pin. If the L/R selection pin is used for switching than another pin may be needed to control the stereo mode.

Figure 4:
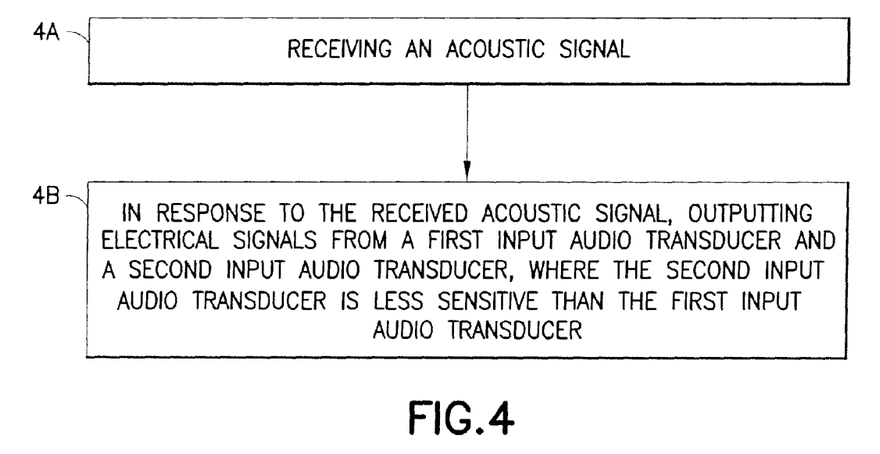
FIG. 4 is a logic flow diagram that illustrates a method, and the result of execution of computer program instructions, at the device in accordance with exemplary embodiments of this invention that employ two input audio transducers.

Referring to FIG. 4, in accordance with an exemplary method at Block 4A, there is a step of receiving an acoustic signal at a device 5, and at Block 4B in response to the received acoustic signal, there is a step of outputting electrical signals from a first input audio transducer and a second input audio transducer, where the second input audio transducer is less sensitive than the first input audio transducer.

The method, where the electrical signals output from the first input audio transducer and from the second input audio transducer are in one pulse density modulation stream.

The method, further comprising: selecting one of either the electrical signal from the first input audio transducer or the electrical signal from the second input audio transducer from based on an analysis of the electrical signals.

The method, further comprising: switching between the electrical signal output from the first input audio transducer and the electrical signal output from the second input audio transducer.

The method, where switching is performed in response to a user input.

The method, where switching is performed automatically in response to circuitry.

The method, where a difference in the sensitivity of the second input transducer is due at least in part to a configuration of a membrane of the second input audio transducer.

The method, where a difference in the sensitivity of the second input audio transducer is due at least in part to a capacitive gap between the second input audio transducer and a back-plate of a substrate over which at least the second input audio transducer is mounted.

Where the method is performed by a microphone system that is either a micro electro-mechanical system microphone or an electrets condenser microphone system.

The method, implemented in a mobile device.

It should be further appreciated that the exemplary embodiments of this invention pertain to apparatus, which may be embodied as a substrate 30; a first input audio transducer mounted over the substrate 30 and configured to output an electrical signal from an acoustic signal; and a second input audio transducer mounted over the substrate 30 and configured to output an electrical signal from an acoustic signal, where the second input audio transducer is less sensitive than the first input audio transducer.

Figure 7:
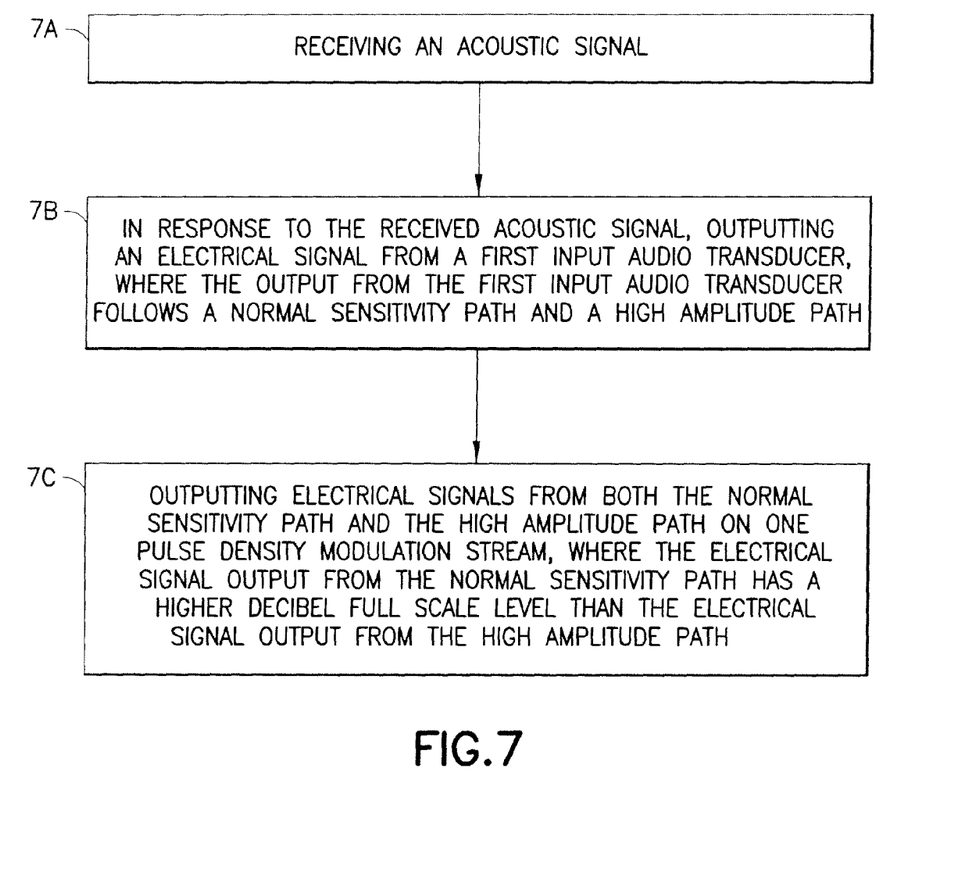
FIG. 7 is a logic flow diagram that illustrates a method, and the result of execution of computer program instructions, at the device in accordance with exemplary embodiments of this invention that employs two sensitivity paths from a first audio input transducer.

Referring to FIG. 7, in accordance with an exemplary method at Block 7A, receiving an acoustic signal at device 5; and at Block 7B in response to the received acoustic signal, there is a step of outputting an electrical signal from an input audio transducer, where the output from the input audio transducer follows a normal sensitivity path and a high amplitude path; and at Block 7C there is a step of outputting electrical signals from both the normal sensitivity path and the high amplitude path on one pulse density modulation stream, where the electrical signal output from the normal sensitivity path has a higher decibel full scale level than the electrical signal output from the high amplitude path.

The method, further comprising: selecting the electrical signal output from either the high amplitude path or the normal sensitivity path based on an examination of the pulse density modulation stream.

The method, where at least one of either the high amplitude path or the normal sensitivity path contains a high pass filter.

The method, implemented in a mobile device.

It should be further appreciated that the exemplary embodiments of this invention pertain to apparatus, which may be embodied as an input audio transducer configured to output an electrical signal from an acoustic signal, where the electrical signal passes through a normal sensitivity path and a high amplitude path; and circuitry configured to output the electrical signals passed through both the normal sensitivity path and the high amplitude path on one pulse density modulation stream, where the electrical signal output from the normal sensitivity path has a greater decibel full scale level than the electrical signal output from the high amplitude path.

The various blocks shown in FIGS. 4 and 7 may be viewed as method steps, and/or as operations that result from operation of computer program code, and/or as a plurality of coupled logic circuit elements constructed to carry out the associated function(s). For example, a computer readable memory executable by a processor may include program instructions that when executed by a processor result in the actions recited at FIGS. 4 and 7 for processing those signals which are output from the input audio transducer(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
   receiving an acoustic signal;
   in response to the received acoustic signal, outputting an electrical signal from an input audio transducer, where the output from the input audio transducer follows a normal sensitivity path and a high amplitude path; and
   outputting electrical signals from both the normal sensitivity path and the high amplitude path on one pulse density modulation stream, where the electrical signal output from the normal sensitivity path has a higher decibel full scale level than the electrical Signal output from the high amplitude path.

2. The method as in claim 1, further comprising:
   selecting the electrical signal output from either the high amplitude path or the normal sensitivity path based on an examination of the pulse density modulation stream.

3. The method as in claim 1, wherein data on a rising edge of the one pulse density modulation stream is one electrical signal out of the electrical signals from the normal sensitivity path and the high amplitude path, and data on a falling edge of the one pulse density modulation stream is a further electrical signal out of the electrical signals from the normal sensitivity path and the high amplitude path, the further electrical signal being from a different path than the electrical signal on the rising edge.

4. The method as in claim 1, further comprising:
   examining the pulse density modulation stream for evidence of clipping in either the electrical signal output from the normal sensitivity path or the electrical signal output from the high amplitude path.

5. The method as in claim 4, further comprising:
   selecting at a given time an electrical signal with a minimum clipping out of the electrical signals from the normal sensitivity path and the high amplitude path.

6. An apparatus comprising:
   an input audio transducer configured to output an electrical signal from an acoustic signal, where the electrical signal passes through a normal sensitivity path and a high amplitude path; and
   circuitry configured to output the electrical signals passed through both the normal sensitivity path and the high amplitude path on one pulse density modulation stream, where the electrical signal output from the normal sensitivity path has a greater decibel full scale level than the electrical signal output from the high amplitude path.

7. The apparatus as in claim 6, where the circuitry is further configured to examine the pulse density modulation stream for evidence of clipping in either the electrical signal output from the normal sensitivity path or the electrical signal output from the high amplitude path.

8. The apparatus as in claim 7, wherein the circuitry is further configured to
   select at a given time an electrical signal with a minimum clipping out of the electrical signals from the normal sensitivity path and the high amplitude path.

9. The apparatus as in claim 7, wherein the circuitry is further configured to select the electrical signal output from either the high amplitude path or the normal sensitivity path based on an examination of the pulse density modulation stream.

10. The apparatus as in claim 6, further comprising:
at least one high pass filter connected to at least one of the normal sensitivity path or the high amplitude path.

11. The apparatus as in claim 6, implemented in a mobile device.

12. The apparatus as in claim 6, wherein data on a rising edge of the one pulse density modulation stream is one electrical signal out of the electrical signals from the normal sensitivity path and the high amplitude path, and data on a falling edge of the one pulse density modulation stream is a further electrical signal out of the electrical signals from the normal sensitivity path and the high amplitude path, the further electrical signal being from a different path than the electrical signal on the rising edge.

13. The apparatus as in claim 6, further comprising
a substrate, the input audio transducer mounted over the substrate, where the input audio transducer forms a first input audio transducer; and
a second input audio transducer mounted over the substrate and configured to output an electrical signal from an acoustic signal, where the second input audio transducer is less sensitive than the first input audio transducer,
where a difference in the sensitivity of the second input audio transducer relative to the first input audio transducer is due at least in part to a configuration of a membrane of the second input audio transducer or
a difference in the sensitivity of the second input audio transducer relative to the first input audio transducer is due at least in part to a capacitive gap between the second input audio transducer and a back-plate of the substrate.

* * * * *